(12) United States Patent
Tanaka et al.

(10) Patent No.: US 7,976,707 B2
(45) Date of Patent: Jul. 12, 2011

(54) APPARATUS AND METHOD FOR TREATING ORGANIC-CONTAINING WASTEWATER

(75) Inventors: Michiaki Tanaka, Tokyo (JP); Yoshimi Taguchi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 75 days.

(21) Appl. No.: 12/086,148

(22) PCT Filed: Dec. 25, 2006

(86) PCT No.: PCT/JP2006/325727
§ 371 (c)(1),
(2), (4) Date: Jun. 6, 2008

(87) PCT Pub. No.: WO2007/077776
PCT Pub. Date: Jul. 12, 2007

(65) Prior Publication Data
US 2009/0283471 A1    Nov. 19, 2009

(30) Foreign Application Priority Data
Dec. 27, 2005 (JP) .................. 2005-375133

(51) Int. Cl.
*C02F 3/30* (2006.01)
(52) U.S. Cl. ............. 210/605; 210/631; 210/259
(58) Field of Classification Search ........... 210/605, 210/615, 616, 617, 620, 630, 631, 150, 151, 210/252, 259
See application file for complete search history.

(56) References Cited

U.S. PATENT DOCUMENTS

| | | | | |
|---|---|---|---|---|
| 4,431,543 A | * | 2/1984 | Matsuo et al. | 210/605 |
| 4,503,154 A | * | 3/1985 | Paton | 435/167 |
| 5,342,522 A | * | 8/1994 | Marsman et al. | 210/605 |
| 5,405,532 A | * | 4/1995 | Loew et al. | 210/631 |
| 5,804,076 A | * | 9/1998 | Yamasaki et al. | 210/609 |
| 6,063,279 A | * | 5/2000 | Yamasaki et al. | 210/605 |
| 7,166,219 B2 | * | 1/2007 | Kohler et al. | 210/601 |
| 2004/0050777 A1 | * | 3/2004 | Khan | 210/603 |
| 2005/0035059 A1 | * | 2/2005 | Zhang et al. | 210/605 |
| 2005/0131086 A1 | * | 6/2005 | Dancuart Kohler et al. | 518/726 |
| 2009/0283471 A1 | | 11/2009 | Tanaka et al. | |

FOREIGN PATENT DOCUMENTS

| | | | |
|---|---|---|---|
| JP | 58-043295 A | * | 3/1983 |
| JP | 61-141999 A | * | 6/1986 |

(Continued)

*Primary Examiner* — Fred Prince
(74) *Attorney, Agent, or Firm* — Manabu Kanesaka

(57) ABSTRACT

In treating organic-containing wastewater by a biological treatment in a stage prior to a advanced treatment such as membrane separation or the like, the amount of the biological metabolites produced in the biological treatment step is reduced to reduce the amount of the organic substances flowing into the advanced treatment step in a latter stage, thereby making the advanced treatment stable and efficient and efficiently recovering treated water of high quality. Water anaerobically biologically treated in an anaerobic reaction tank 11 including an acid production tank 11A and a UASB reaction tank 11B is subjected to a coagulation treatment and then to solid-liquid separation in a No. 1 sedimentation tank 14. The resultant separated water is aerobically biologically treated water is subjected to a coagulation treatment and then to solid-liquid separation in a No. 2 sedimentation tank 24. Then, the resultant water is subjected to a membrane separation treatment in a RO membrane separator 40 as advanced treatment means. By performing anaerobic biological treatment, aerobic biological treatment, and solid-liquid separation prior to the advanced treatment means, organic substances can be sufficiently removed, and treatment by the advanced treatment means can be made stable and efficient.

14 Claims, 3 Drawing Sheets

FOREIGN PATENT DOCUMENTS

| | | |
|---|---|---|
| JP | S62-102896 A | 5/1987 |
| JP | H07-232192 | 9/1995 |
| JP | H08-112600 | 5/1996 |
| JP | 2002-126784 | 5/2002 |
| JP | 2005-125203 A | 5/2005 |
| JP | 2005-238152 | 9/2005 |

* cited by examiner

APPARATUS AND METHOD FOR TREATING ORGANIC-CONTAINING WASTEWATER

TECHNICAL FIELD

The present invention relates to an apparatus and method for treating organic-containing wastewater, and particularly to an apparatus and method in which when organic-containing wastewater is subjected to a biological treatment and then an advanced treatment to recover treated water, the amount of organic substances flowing into the advanced treatment step is reduced to make the advanced treatment stable and efficient, thereby efficiently recovering treated water of high quality.

BACKGROUND ART

In recent years, recycling of water resources has been regarded as important, and wastewater has been positively recovered by treatments. In particular, membrane separators having fine pores, such as a ultrafiltration (UF) membrane and a reverse osmosis (RO) membrane, are widely used because they are capable of removing high-molecular-weight organic substances and obtaining treated water of high quality. On the other hand, the membrane separators have a small membrane pore size, and thus when the concentration of organic substances flowing into the separators increases, the organic substances easily accumulate on a membrane surface to significantly increase filtration resistance, thereby causing difficulty in water flow. In such a case, it is effective for a stable treatment to install a biological treatment system in a stage prior to membrane separator in order to reduce the concentration of organic substances in wastewater before a membrane separation treatment.

When a biological treatment is performed in a stage prior to a membrane separation treatment, for example, as shown in FIG. 3, organic-containing wastewater is biologically treated in an aeration tank 21, the biologically treated water is successively subjected to coagulation treatments in coagulation tanks 22 and 23 by adding a coagulant thereto, and the water undergoing coagulation treatments is subjected to solid-liquid separation in a sedimentation tank 24, followed by filtration of the separated water with a filter 30 and then membrane separation of the filtered water with a membrane separator 40. Such an apparatus for treating organic-containing wastewater is disclosed in, for example, Japanese Unexamined Patent Application Publication No. 2005-238152.

However, even if ready biodegradable organic substances are treated in the biological treatment step prior to the membrane separation treatment, several % of metabolites of refractory microorganisms is produced in the process of degrading organic substances in wastewater and is contained in biologically treated water. The metabolites are considered to be produced in a process in which the microorganisms mainly produced by degradation of organic substances contained in raw water are degraded by food chains between the microorganisms, many of the metabolites have a relatively high molecular weight and thus cause clogging of a membrane surface of the membrane separator when the concentration increases. Therefore, even when the biological treatment system is installed in a stage prior to the membrane separator, the concentration of the biological metabolites produced increases as the concentration of the organic substances in wastewater increases, and thus the membrane separator tends to become gradually difficult to stably operate.

Also, even when organic substances are removed by an ion exchange resin or oxidation treatment as an advanced treatment for recovering water, an increase in the concentration of organic substances in the water supplied to the advanced treatment step results in an increase in amount of the ion exchange resin used, an increase in exchange frequency of the ion exchange resin, or an increase in amount of the oxidizer used, causing a factor which inhibits stabilization of the treatment.

Patent Document 1: Japanese Unexamined Patent Application Publication No. 2005-238152

SUMMARY OF THE INVENTION

An object of the present invention is to provide an apparatus and method for treating organic-containing wastewater in which when organic-containing wastewater is biologically treated in a stage prior to an advanced treatment such as membrane separation, the amount of the biological metabolites produced in the biological treatment step is reduced to reduce the amount of organic substances flowing into the advanced treatment step in a latter stage and make the advanced treatment stable and efficient, thereby efficiently recovering treated water of high quality.

An apparatus for treating organic-containing wastewater of the present invention includes anaerobic biological treatment means for anaerobically biologically treating organic-containing wastewater, aerobic biological treatment means for aerobically biologically treating the anaerobically biologically treated water flowing out of the anaerobic biological treatment means, solid-liquid separation means for performing solid-liquid separation of the aerobically biologically treated water flowing out of the aerobic biological treatment means, and advanced treatment means for removing dissolved substances contained in the water separated by the solid-liquid separation means.

The advanced treatment means is preferably a membrane separator.

A coagulation tank may be provided between the aerobic biological treatment means and the solid-liquid separation means, for effecting a coagulation reaction by adding a coagulant to the aerobically biologically treated water.

Solid-liquid separation means may be provided for performing solid-liquid separation of the anaerobically biologically treated water flowing out of the anaerobic biological treatment means. In this case, the water separated by the solid-liquid separation means is aerobically biologically treated by the aerobic biological treatment means.

A coagulation tank may be provided between the anaerobic biological treatment means and the solid-liquid separation means for performing solid-liquid separation of the anaerobically biologically treated water flowing out of the anaerobic biological treatment means, for effecting a coagulation reaction by adding a coagulant to the anaerobically biologically treated water.

A method for treating organic-containing wastewater of the present invention includes an anaerobic biological treatment step of anaerobically biologically treating organic-containing wastewater, an aerobic biological treatment step of aerobically biologically treating the anaerobically biologically treated water flowing out of the anaerobic biological treatment step, a solid-liquid separation step of performing solid-liquid separation of the aerobically biologically treated water flowing out of the aerobic biological treatment step, and an advanced treatment step of removing dissolved substances contained in the separated water separated by the solid-liquid separation step.

The advanced treatment step is preferably a membrane separation step.

A coagulation step of effecting a coagulation reaction by adding a coagulant to the aerobically biologically treated water may be performed between the aerobic biological treatment step and the solid-liquid separation step.

A solid-liquid separation step of performing solid-liquid separation of the anaerobically biologically treated water flowing out of the anaerobic biological treatment step may be performed. In this case, the water separated by the solid-liquid separation step is aerobically biologically treated in the aerobic biological treatment step.

A coagulation step of effecting a coagulation reaction by adding a coagulant to the anaerobically biologically treated water may be performed between the anaerobic biological treatment step and the solid-liquid separation step of performing solid-liquid separation of the anaerobically biologically treated water flowing out of the anaerobic biological treatment step.

DETAILED DESCRIPTION

Figure 1:
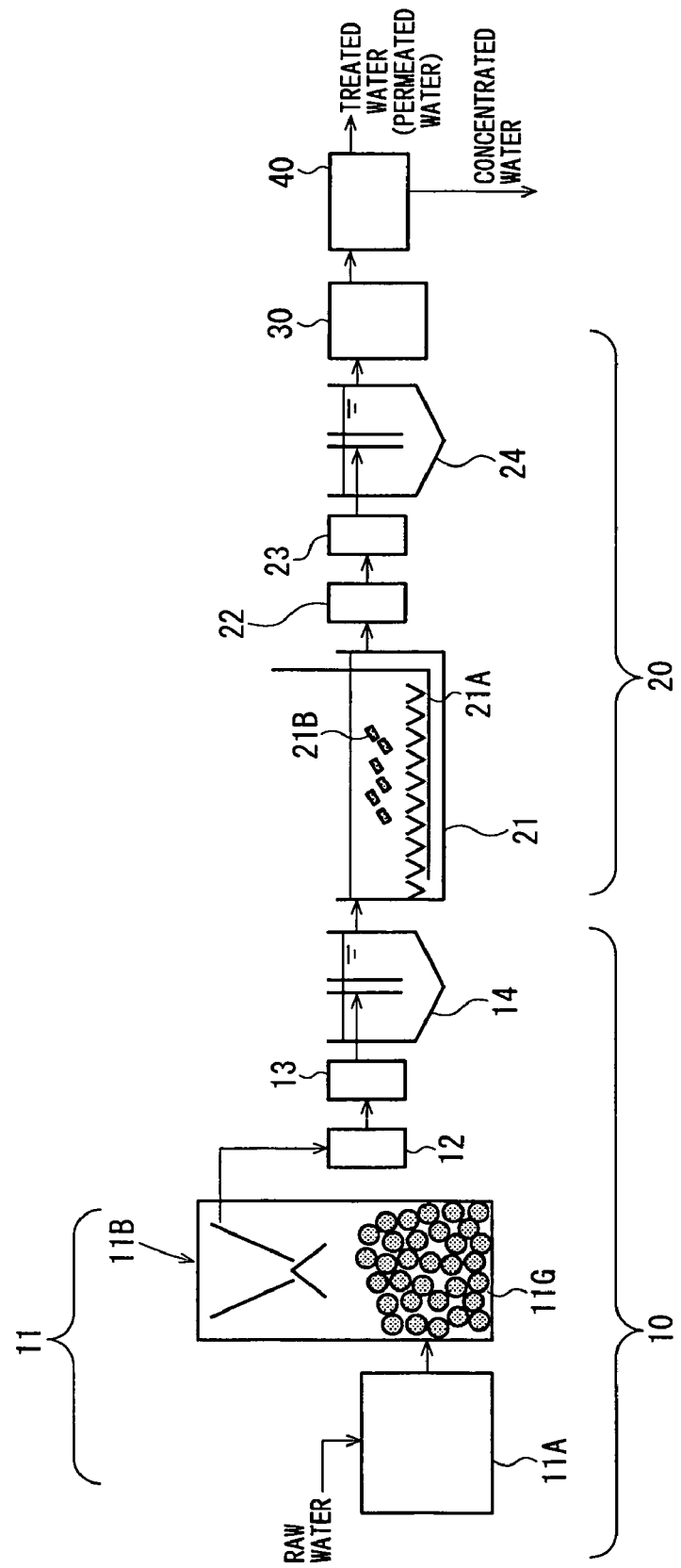
FIG. 1 is a systematic diagram showing an apparatus for treating organic-containing wastewater according to an embodiment of the present invention.

According to the present invention, most soluble organic substances are degraded by anaerobic biological treatment means, and many carbons derived from raw water are released as methane gas from an aqueous layer. Then, the soluble organic substances remaining after an anaerobic biological treatment are mainly degraded by aerobic biological treatment means, and the microorganisms produced by these biological treatments are separated by solid-liquid separation means. Therefore, a series of anaerobic biological treatment, aerobic biological treatment, and solid-liquid separation can reduce the amount of biological metabolites to reduce the amount of the organic substances flowing into advanced treatment means, thereby permitting stable treatment of wastewater.

The advanced treatment of water from which the organic substances have been sufficiently removed is capable of producing treated water of high quality. The water treated by the advanced treatment means is of extremely high quality and thus can be recovered directly as reuse water or as raw water for pure water and extra-pure water.

In the advanced treatment means, since water having a sufficiently reduced organic concentration is treated, the load of the advanced treatment is decreased. If the advanced treatment means is a membrane separator, membrane contamination can be prevented, and the flux is little decreased with time, thereby permitting the continuation of stable treatment over a long period of time. If the advanced treatment means is ion exchange equipment, the organic material load and organic contamination can be decreased, thereby improving the quality of treated water and decreasing the regeneration frequency of the resin and the exchange frequency of the resin. If the advanced treatment means is oxidation equipment, the organic material load can be decreased, thereby decreasing the amount of the oxidizer used and the size of the equipment.

An apparatus and method for treating organic-containing wastewater according to an embodiment of the present invention are described in detail below.

[Organic-Containing Wastewater]

In the present invention, organic-containing wastewater to be treated may be organic-containing wastewater which is usually biologically treated and is not particularly limited. Examples of the organic-containing wastewater include electronic industry wastewater, chemical plant wastewater, and food plant wastewater. For example, in a process for manufacturing electronic components, large amounts of various types of organic wastewater are produced from a development step, a separation step, an etching step, a washing step, etc. and wastewater is desired to be recovered, purified to a pure water level, and reused. Therefore, such wastewater is suitable as wastewater to be treated in the present invention.

Examples of such organic-containing wastewater include organic wastewater containing isopropyl alcohol, ethyl alcohol, or the like, organic wastewater containing organic nitrogen or ammonia nitrogen such as monoethanol amine (MEA), tetramethylammonium hydroxide (TMAH), or the like, and organic wastewater containing organosulfur compounds such as dimethyl sulfoxide (DMSO).

[Anaerobic Biological Treatment]

As the anaerobic biological treatment means for anaerobically biologically treating wastewater, a known anaerobic biological treatment-system biological reaction tank can be used as long as it has an excellent efficiency of organic degradation.

The anaerobic biological treatment means may be either a single-tank type in which acid generation reaction and methane generation reaction are performed in the same tank or a two-tank type in which these reactions are performed in respective tanks. Each of the reaction tanks may be any desired type such as a suspension type (stirring type), a sludge bed type (sludge blanket type), or the like, or a carrier addition type or a granulated sludge type.

The anaerobic biological treatment means is not particularly limited, but it preferably includes an acid generation tank and an UASB (up-flow anaerobic sludge blanket)-system reaction tank because a high-load operation can be performed.

[Aerobic Biological Treatment]

As the aerobic biological treatment means for aerobically biologically treating wastewater, a known aerobic biological treatment-system biological reaction tank can be used as long as it has an excellent efficiency of organic degradation. For example, a suspension system in which activated sludge is maintained in a suspension state in a tank or a biological membrane system in which activated sludge is adhered to a carrier and maintained can be used. The biological membrane system may be any desired microbial bed system such as a fixed bed system, a fluidized bed system, or an expanded bed system, and any one of activated carbon, various plastic carriers, and sponge carriers can be used as the carrier.

As the carrier, a sponge carrier is preferred because the sponge carrier can maintain microorganisms at a high concentration. Although a sponge raw material is not particularly limited, an ester-type polyurethane is preferred. Also, although the amount of the carrier charged is not particularly limited, the apparent volume of the carrier relative to the volume of the biological reaction tank is generally about 10% to 50%, particularly preferably about 30% to 50%.

As the aerobic biological reaction tank for microbially degrading organic substances under aerobic conditions, an aeration tank provided with oxygen gas supply means for supplying oxygen (air) into the tank, such as a diffusion tube or an aerator, can be used.

The aerobic biological reaction tank may be either a single-tank type or a multi-tank type, or a single-tank type having a partition wall provided in a tank.

[Coagulation Treatment]

The aerobically biologically treated water obtained by aerobic biological treatment after anaerobic biological treatment of organic wastewater is preferably subjected to a coagulation treatment before solid-liquid separation in order to securely remove microorganisms and polymer organic substances by the solid-liquid separation means in a latter stage. A usual coagulation treatment unit is used for the coagulation treatment of the aerobically biologically treated water. The coagulation treatment unit may include a single coagulation tank or two or more tanks provided in multiple stages.

The coagulation treatment unit generally includes a rapid mixing tank for sufficient contact between a coagulant and water to be treated and a slow mixing tank for growing coagulated flocs. Therefore, when two or more coagulation tanks are provided in multiple stages, preferably, a coagulation tank in a former stage is the rapid mixing tank, and a coagulation tank in a latter stage is the slow mixing tank.

Examples of an inorganic coagulant used for the coagulation treatment include iron-based coagulants such as ferric chloride, iron polysulfate, and the like; and aluminum-based coagulants such as aluminum sulfate, aluminum chloride, polyaluminum chloride, and the like. From the viewpoint of a coagulation effect, an iron-based coagulant is preferred. These inorganic coagulants may be used alone or in a combination of two or more.

In the coagulation treatment, the inorganic coagulant used is adjusted to preferred pH by adding a pH adjuster according to demand. Namely, with respect to a pH condition, for example, it is effective for an iron-based coagulant to be subjected to reaction at pH 5.5 or less, and it is effective for an aluminum-based coagulant to be subjected to reaction at pH 5.0 or less and then adjusted to pH 6.0 or more. Therefore, according to demand, the pH is preferably adjusted by adding an acid such as hydrochloric acid (HCl), sulfuric acid ($H_2SO_4$), or the like, or an alkali such as sodium hydroxide (NaOH) or the like. Although the detailed reason why high-quality treated water can be obtained by the coagulation treatment under such a pH condition is not known, it is supposed that neutralization of the charge of a protein component in the biological metabolites is concerned.

In the coagulation treatment, soluble organic substances and suspended substances in the biologically treated water are flocculated. In order to grow the coagulated flocs, an inorganic coagulant and a polymer coagulant may be added to a first coagulation tank and a second coagulation tank, respectively.

[Solid-Liquid Separation]

The solid-liquid separation means for the aerobically biologically treated water and preferably the treated water obtained by the coagulation treatment of the aerobically biologically treated water is not limited to a sedimentation tank, a flotation tank, a centrifugal separator, or the like. However, a pressure flotation tank, particularly a coagulation pressure flotation tank, is compact and thus preferred because the coagulated flocs of the biologically treated water are easily floated and an apparatus with a smaller area than a sedimentation tank may be used. Also, membrane separation means such as an immersion membrane may be used for solid-liquid separation of the aerobically biologically treated water.

[Advanced Treatment]

The advanced treatment means may be means for further removing dissolved organic substances remaining in the treated water which is produced by removing the organic substances from wastewater through the anaerobic biological treatment means, the aerobic biological treatment means, and the solid-liquid separation means, means for removing solvent salts contained in the treated water, or means for removing both the dissolved organic substances and the solvent salts.

The following is given as the advanced treatment means.

Membrane separator: for example, $R^O$, NF (nano filtration), and UF membrane separators, for removing organic substances and salts Ion exchange equipment: for example, an anion exchanger, a cation exchanger, a mixed bed filled with a mixture of a cation exchange resin and an anion exchange resin, and an electric desalter, for removing salts and organic substances Oxidation equipment: for example, ozone oxidation equipment, hydrogen peroxide oxidation equipment, chlorine oxidation equipment, ultraviolet-ray oxidation equipment, and a combination thereof, for removing organic substances Equipment for ion exchange, membrane separation, or the like is frequently provided in a stage after the oxidation equipment.

These advanced treatment means may be appropriately used in a combination of two or more. Also, another unit such as a filter, activated carbon treatment equipment, or the like may be added as a part of the advanced treatment means.

In particular, when the RO membrane separator is used as the advanced treatment means, a filter is preferably provided in a stage prior to the RO membrane separator, for removing SS from water. As the filter, a packed bed filter packed with a filter material such as sand, anthracite, or the like, a membrane filter using a membrane such as a microfiltration (MF) membrane, an ultrafiltration (UF) membrane, or the like can be used.

[Solid-Liquid Separation of Anaerobically Biologically Treated Water]

In the present invention, the anaerobically biologically treated water from the anaerobic biological treatment means can be directly introduced into the aerobic biological treatment means and treated therein without solid-liquid separation. However, from the viewpoint of inhibition of autolysis of microorganisms produced by the anaerobic biological treatment, solid-liquid separation means is preferably provided in a stage after the anaerobic biological treatment means.

In this case, the solid-liquid separation means for the anaerobically biologically treated water is not particularly limited to a sedimentation tank, a flotation tank, a centrifugal separator, or the like. However, from the viewpoint that microorganisms and polymeric organic substances can be securely removed, the aerobically biologically treated water is preferably subjected to coagulation treatment and then solid-liquid separation treatment, and a coagulation-pressure flotation system is compact and particularly preferred.

When a coagulation tank and a sedimentation tank are provided for the anaerobically biologically treated water, the same coagulation tank as described above in [Coagulation treatment] can be used, and the coagulation treatment conditions are the same as the above.

When solid-liquid separation is not performed for the anaerobically biologically treated water, autolysis of the microorganisms produced in the anaerobic biological treatment partially proceeds in the aerobic biological treatment means. In comparison with this case, however, when solid-liquid separation is performed for the anaerobically biologically treated water, the amount of the microorganisms produced and to be subjected to autolysis in the aerobic biological treatment is significantly decreased, resulting in a significant decrease of the concentration of residual microorganism metabolites. This is because the aerobic biological treatment method such as an activated sludge method uses oxygen as an electron acceptor and has a high efficiency of energy recovery for the microorganisms, and thus the amount of microorganisms initially produced at a $COD_{Cr}$ load of 1 Kg is about 0.4 to 0.5 Kg (for example, Willi Gujor et al. use a VSS yield per $COD_{Cr}$ of 0.63×0.75=0.47 as a parameter of typical IAWQ sludge model 3, Wat. Sci. Tech., 1999).

[Apparatus for Treating Organic-Containing Wastewater]

An example of the apparatus for treating organic-containing wastewater of the present invention is described with reference to the drawings.

Figure 2:
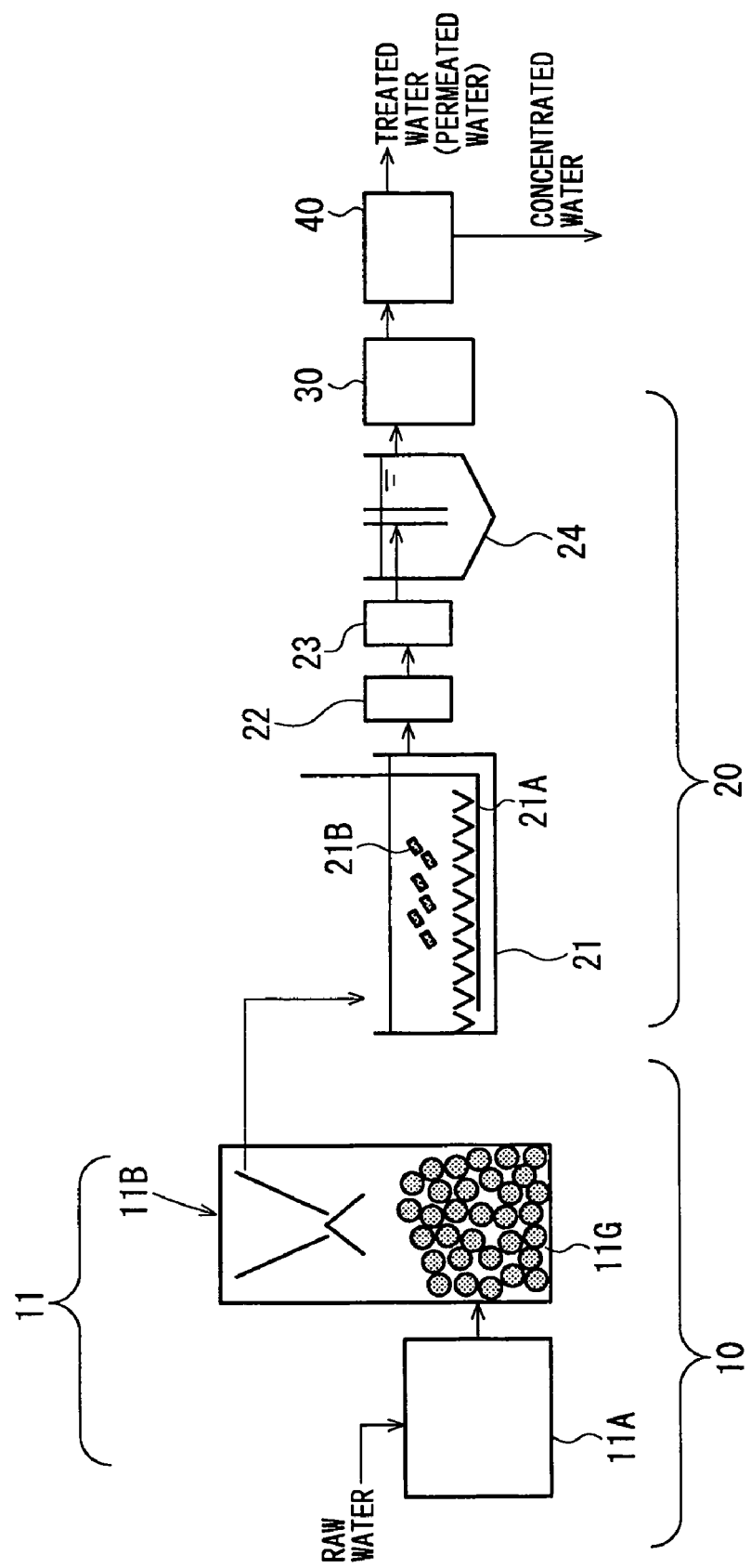
FIG. 2 is a systematic diagram showing an apparatus for treating organic-containing wastewater according to another embodiment of the present invention.

FIGS. 1 and 2 are systematic diagrams each showing an apparatus for treating organic-containing wastewater according to an embodiment of the present invention. FIGS. 1 and 2 each show an example of the apparatus for treating organic-containing wastewater of the present invention, and the apparatus for treating organic-containing wastewater of the present invention is not limited to the examples shown in FIGS. 1 and 2. For example, the advanced treatment means is not limited to the RO membrane separator, and ion exchange equipment or oxidation equipment may be used.

The apparatus for treating organic-containing wastewater shown in FIG. 1 includes an anaerobic biological treatment unit 10, as the anaerobic biological treatment means, which includes an anaerobic reaction tank 11 including an acid production tank 11A and a UASB reaction tank (up-flow sludge blanket reaction tank) 11B which holds granule sludge 11G, a coagulation tank (may be referred to as a "No. 1-1 coagulation tank" hereinafter) 12 and a coagulation tank (may be referred to as a "No. 1-2 coagulation tank" hereinafter) 13 which are arranged in two stages for coagulating the anaerobically biologically treated water from the anaerobic reaction tank 11 (UASB reaction tank 11B), and a sedimentation tank (may be referred to as a "No. 1 sedimentation tank" hereinafter) 14 for solid-liquid separation of the water having undergone coagulation treatment in the No. 1-2 coagulation tank 13; an aerobic biological treatment unit 20, as the aerobic biological treatment means, to which water separated by the No. 1 sedimentation tank 14, i.e., water treated by the anaerobic biological treatment unit 10, is introduced and which includes an aeration tank 21, a coagulation tank (may be referred to as a "No. 2-1 coagulation tank" hereinafter) 22 and a coagulation tank (may be referred to as a "No. 2-2 coagulation tank" hereinafter) 23 which are arranged in two stages for coagulating the aerobically biologically treated water from the aeration tank 21, and a sedimentation tank (may be referred to as a "No. 2 sedimentation tank" hereinafter) 24 serving as solid-liquid separation means for solid-liquid separation of the water having undergone coagulation treatment in the No. 2-2 coagulation tank 23; a filter 30 to which water separated by the No. 2 sedimentation tank 24, i.e., water treated by the aerobic biological treatment unit 20, is introduced; and a RO membrane separator 40 as the advanced treatment means to which water filtered by the filter 30 is introduced.

Raw water (organic-containing wastewater) is successively introduced into the acid production tank 11A and the UASB reaction tank 11B to remove most soluble organic substances and release most of the carbons derived from the raw material as by-product methane gas from an aqueous layer. In the anaerobic biological treatment, the energy recovery coefficient for microorganisms is low, and the initial amount of the microorganisms produced relative to 1 Kg of raw material $COD_{Cr}$ load is 0.1 Kg or less. The progress of autolysis due to food chains between microorganisms is as low as about ⅕ of that under aerobic conditions and is usually at a negligible level as compared with aerobic conditions (Lawrence, A. L. and MacCarty, P. L., Jour, Water Poll. Control Fed., 1969).

A preferred operation mode slightly varies depending on the degradability of organic substances contained in the raw water. However, the load is preferably determined to remove 60 to 95%, more preferably 80 to 90%, of soluble organic substances in the raw water.

The $COD_{Cr}$ sludge load for the above conditions is generally 0.1 to 1.0 Kg-$COD_{Cr}$/Kg-VSS/day and more preferably 0.3 to 0.8 Kg-$COD_{Cr}$/Kg-VSS/day.

Then, the anaerobically biologically treated water from the UASB reaction tank 11B is subjected to coagulation by adding an inorganic coagulant thereto in the No. 1-1 coagulation tank 12, and then flocs are coarsened by adding a pH adjustor and/or a polymer coagulant in the No. 1-2 coagulation tank 13. Then, the water having undergone coagulation is fed to the No. 1 sedimentation tank 14 for solid-liquid separation of coagulated flocs.

The water having undergone solid-liquid separation in the No. 1 sedimentation tank 14 is then introduced into the aeration tank 21 and aerobically biologically treated under aeration from a diffusion tube 12A. In the aeration tank 21, soluble organic substances remaining after the anaerobic biological treatment are degraded. In the aeration tank 21, preferably, degradation securely proceeds so that the concentration of organic substances flowing into the RO membrane separator 40 serving as the advanced treatment means in a latter stage can be decreased as much as possible. The BOD sludge load is preferably 0.01 to 0.30 Kg-BOD/Kg-VSS/day and more preferably 0.05 to 0.2 Kg-BOD/Kg-VSS/day. The aeration tank 21 preferably holds a carrier 22B therein so as to stably maintain the amount of microorganisms even with a low load. The load of the No. 2 aeration tank is preferably 0.03 to 1.8 Kg-BOD/m³/day and particularly preferably 0.15 to 1.2 Kg-BOD/m³/day. In addition, SRT is preferably 5 to 50 days.

Then, the aerobically biologically treated water from the aeration tank 21 is subject to coagulation by adding an inorganic coagulant thereto in the No. 2-1 coagulation tank 22, and then flocs are coarsened by adding a pH adjustor and/or a polymer coagulant in the No. 2-2 coagulation tank 23. Then, the water having undergone coagulation is fed to the No. 2 sedimentation tank 24 for solid-liquid separation of coagulated flocs.

The water having undergone solid-liquid separation in the No. 2 sedimentation tank 24 is then subjected to the removal of residual SS in the filter 30 and then RO membrane separation in the RO membrane separator 40, and permeated water is taken out as treated water.

The configuration of the apparatus for treating organic-containing wastewater shown in FIG. 2 the same as that of the apparatus for treating organic-containing wastewater shown in FIG. 1 except that the coagulation tanks 12 and 13 and the sedimentation tank 14 for coagulation and solid-liquid separation of the anaerobically biologically treated water from the anaerobic reaction tank 11 (UASB reaction tank 11B) in the anaerobic biological treatment unit 10A are omitted.

In this apparatus for treating organic-containing wastewater, the same treatments as in the apparatus for treating organic-containing wastewater shown in FIG. 1 are performed except that the anaerobically biologically treated water from the anaerobic reaction tank 11 is introduced directly into the aeration tank 21 and aerobically biologically treated without coagulation and solid-liquid separation.

In each of the apparatuses for treating organic-containing wastewater shown in FIGS. 1 and 2, treated water of high quality can be obtained by anaerobic biological treatment, aerobic biological treatment, and solid-liquid separation in steps prior to the RO membrane separator 40, and water with a low FI value can be supplied to the RO membrane separator 40. Therefore, it is possible to suppress a decrease in membrane flux of the RO membrane separator 40 and stably obtain treated water for a long period of time.

The FI value is used for determining whether or not the quality of water supplied to the RO membrane separator is suitable for RO membrane treatment when water is passed through the RO membrane separator and deionized. Even when water has substantially the same amounts of dissolved organic substances and SS in water, the membrane flux in RO membrane treatment may be decreased in an early stage. In this case, a difference occurs in the FI value of water supplied to RO treatment.

The FI value can be determined from the initial time required and the time required after water passage for a predetermined time in an operation of measuring the time required for a predetermined amount of sample water to be filtered through a membrane filter having a predetermined pore diameter. Namely, the FI value is used for determining whether or not water easily causes membrane contamination and membrane clogging. Although water of quality at a FI value of 5 or less is allowed as water to be supplied to RO treatment, water quality is desired to be a FI value of 3 or less. Therefore, in the present invention, when the RO membrane separator is used as the advanced treatment means, water at a FI value or 3 or less can be obtained by anaerobic biological treatment, aerobic biological treatment, and solid-liquid separation, and the water is preferably supplied to the RO membrane separator 40.

EXAMPLES

The present invention is described in further detail below with reference to examples and a comparative example.

Examples 1 and 2 and Comparative Example 1

Figure 3:
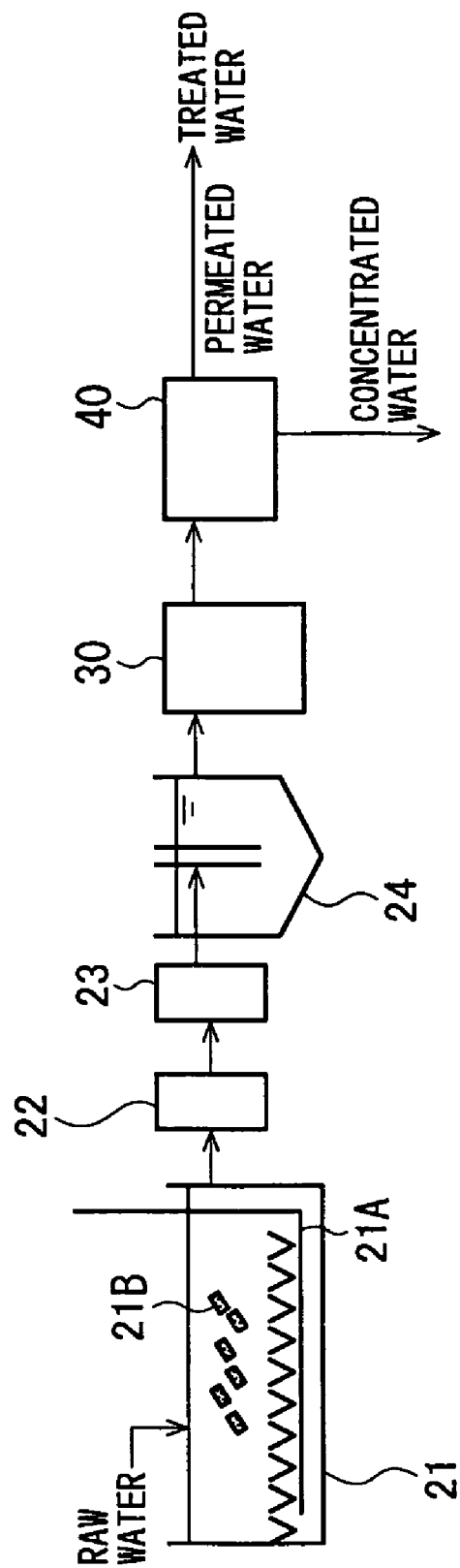
FIG. 3 is a systematic diagram showing a conventional method.

Industrial wastewater of the quality below which contained ethyl alcohol as a main component was used as raw water and treated in an amount of water to be treated of 1000 L/day by the apparatus shown in FIG. 1 (Example 1), FIG. 2 (Example 2), or FIG. 3 (Comparative Example 1). For biological treatment of the raw water, ammonium sulfate and phosphoric acid were added to the raw water so that TOC:N:P=100:15:3 because it was supposed that the raw water was lack of nitrogen and phosphorus.

<Raw Water Quality>

S—$COD_{Cr}$: 1380 mg/L

S-TOC: 368 mg/L

Kj-N: 7.8 mg/L $PO_4$—P: 0.6 mg/L

Table 1 shows the specifications of the apparatuses and the treatment conditions used in Examples 1 and 2 and Comparative Example 1.

Table 2 shows variation per day of water quality in each portion and Table 3 shows variation per day of the flux reduction rate of the RO membrane separator.

Table 4 shows the reaction tank area per quantity of water to be treated of 1000 m³/day (assuming that the water depth in the anaerobic reaction tank including the acid production tank and the UASB reaction tank is 8 m, and the water depth in each of the aeration tank, the coagulation tank, and the sedimentation tank is 4 m).

TABLE 1

| Item | | | Unit | Example 1 | Example 2 | Comparative Example 1 |
|---|---|---|---|---|---|---|
| Anaerobic reaction tank 11 | Acid production tank 11A | Volume | [L] | 150 | 150 | |
| | | Raw water retention time | [hr] | 3.6 | 3.6 | |
| | UASB reaction tank 11B | Volume | [L] | 200 | 200 | |
| | | $COD_{Cr}$ sludge load | [kg-CODCr/ kg-VSS/day] | 0.3 | 0.3 | |
| No. 1-1 coagulation tank 12 | | Volume | [L] | 20 | | |
| | | Amount of coagulant(*2) added | [mg/L] | 400 | | |
| | | Stirring rate | [rpm] | 180 | | |
| No. 1-2 coagulation tank 13 | | Volume | [L] | 20 | | |
| | | pH(*3) | [mg/L] | 5.5 | | |
| | | Stirring rate | [rpm] | 60 | | |
| No. 1 sedimentation tank 14 | | Area | [m²] | 0.05 | | |
| | | Water flow LV | [m/day] | 20 | | |
| Aeration tank 21 | | Volume | [L] | 600 | 600 | 1600 |
| | | Amount of carrier(*1) charged | [L] | 250 | 250 | 670 |
| | | Set tank load | [Kg-BOD/ m³/day] | 0.2 | 0.2 | 0.6 |
| No. 2-1 coagulation tank 22 | | Volume | [L] | 20 | 20 | 20 |
| | | Amount of coagulant(*2) added | [mg/L] | 300 | 500 | 700 |
| | | Stirring rate | [rpm] | 180 | 180 | 180 |
| No. 2-2 coagulation tank 23 | | Volume | [L] | 20 | 20 | 20 |
| | | pH(*3) | [mg/L] | 5.5 | 5.5 | 5.5 |
| | | Stirring rate | [rpm] | 60 | 60 | 60 |

TABLE 1-continued

| | Item | Unit | Example 1 | Example 2 | Comparative Example 1 |
|---|---|---|---|---|---|
| No. 2 sedimentation tank 24 | Area | [m$^2$] | 0.05 | 0.05 | 0.05 |
| | Water flow LV | [m/day] | 20 | 20 | 20 |
| Filter 30(*4) | Water flow LV | [m/hr] | 1.0 | 1.0 | 1.0 |
| RO membrane separator 40 | Membrane used | [—] | \multicolumn{3}{c}{Nitto Denko Corporation "NTR759H R-S2"} | | |
| | Water recovery rate | [%] | 70 | 70 | 70 |

(*1) 5 mm square polyurethane sponge apparent volume
(*2) 38 wt % aqueous ferric chloride solution
(*3) adjusted by adding NaOH
(*4) two-layer filter (φ 100 Å × 2500 mm) packed with sand and anthracite

TABLE 2

| | | Example 1 | Example 2 | Comparative Example 1 |
|---|---|---|---|---|
| Quality of anaerobically biologically treated water (water flowing out of UASB reaction tank) | S-TOC[mg/L] | 88.3 | 86.8 | |
| | SS [mg/L] | 58.9 | 61.3 | |
| Quality of aerobically biologically treated water (water flowing out of aeration tank) | S-TOC[mg/L] | 11.8 | 12.4 | 18.6 |
| | SS [mg/L] | 44.5 | 76.6 | 24.6 |
| Quality of water supplied to RO membrane separator (filtered water) | S-TOC[mg/L] | 6.2 | 7.6 | 11.2 |
| | FI value* [-] | 2.4 | 2.5 | 2.8 |
| Quality of treated water (water permeated through RO membrane separator) | S-TOC[mg/L] | 0.3 | 0.3 | 0.6 |

*Test method: ASTM D4189-95

TABLE 3

| Flux reduction rate | | Example 1 | Example 2 | Comparative Example 1 |
|---|---|---|---|---|
| 5 days after | [%] | 8.7 | 9.2 | 15.9 |
| 15 days after | [%] | 12.5 | 13.7 | 21.6 |
| 30 days after | [%] | 15.3 | 17.1 | 27.2 |

TABLE 4

| | | Example 1 | Example 2 | Comparative Example 1 |
|---|---|---|---|---|
| Tank area [m$^2$] | Anaerobic reaction tank (acid production tank + UASB reaction tank) | 44 | 44 | |
| | No. 1-1 coagulation tank | 5 | | |
| | No. 1-2 coagulation tank | 5 | | |
| | No. 1 sedimentation tank | 50 | | |
| | Aeration tank | 150 | 150 | 400 |
| | No. 2-1 coagulation tank | 5 | 5 | 5 |
| | No. 2-2 coagulation tank | 5 | 5 | 5 |
| | No. 2 sedimentation tank | 50 | 50 | 50 |
| | Total | 314 | 254 | 460 |
| | Total area ratio [%] | 68.2 | 55.2 | 100 |

The above-described results indicate the following:

In Example 1, most of the organic substances in the raw water can be removed by the anaerobic reaction tank including the acid production tank and the UASB reaction tank and further removed as SS by solid-liquid separation in the No. 1 sedimentation tank before autolysis of the microorganisms produced in the anaerobic reaction tank proceeds. In addition, the water separated by the No. 1 sedimentation tank is further treated by the aeration tank to further highly degrade the residual organic substances and SS is removed by the No. 2 sedimentation tank. Consequently, treated water having low S-TOC and low SS can be obtained by the anaerobic reaction tank and the aeration tank having a total volume smaller than the volume of the aeration tank in Comparative Example 1. Further, since coagulation treatment can be sufficiently performed with a small amount of the coagulant added to the coagulation tank, treated water suitable for membrane separation can be obtained with the coagulant added to the No. 1 and No. 2 coagulation tanks in a total amount equivalent to that in Comparative Example 1. Namely, it is possible to obtain treated water having a low S-TOC value and a low FI value which is an index for the coagulation effect and an index for the quality of water supplied to the membrane separator. The treated water can be supplied to the RO membrane separator to obtain good treated water.

In EXAMPLE 2, solid-liquid separation is not performed in a stage after the anaerobic reaction tank, but the resultant treated water has a lower S-TOC value and a lower SS value than in Comparative Example 1.

The flux reduction rates of the RO membrane separator in both Examples 1 and 2 are significantly improved as compared with Comparative Example 1, but Example 1 exhibits a higher improving effect than Comparative Example 2.

Therefore, in the present invention, the organic substance load can be mostly removed by the anaerobic reaction tank, and thus the aeration tank can be decreased in size. Therefore, the total reaction tank area can be decreased by about 30% and about 45% in Examples 1 and 2, respectively, as compared with in Comparative Example 1.

These results indicate that the configuration of EXAMPLE 1 is preferred when treated water of higher quality is required, and the configuration of Example 2 is preferred when there is more need to decrease the installation area.

Although the present invention is described in detail with reference to the specified embodiments, it is obvious to persons skilled in the art that various modifications can be made within the idea and the scope of the present invention.

This application is based on the Japanese patent application (patent application No. 2005-375133) filed Dec. 27, 2005, which is hereby incorporated by reference herein in its entirety.

The invention claimed is:

1. An apparatus for treating organic-containing wastewater comprising:
   anaerobic biological treatment means for anaerobically biologically treating organic-containing wastewater;
   aerobic biological treatment means for aerobically biologically treating the anaerobically biologically treated water flowing out of the anaerobic biological treatment means;
   solid-liquid separation means for performing solid-liquid separation of the aerobically biologically treated water flowing out of the aerobic biological treatment means; and
   reverse osmosis membrane means for removing dissolved substances contained in the water separated by the solid-liquid separation means,
   wherein said anaerobic biological treatment means comprises one tank for performing acid generation reaction and methane generation reaction simultaneously or two tanks for performing the acid generation reaction and the methane generation reaction, separately, and provides a $COD_{cr}$ sludge load of 0.1-1.0 Kg-$COD_{cr}$/Kg-VSS/day, and
   the aerobic biological treatment means provides an aeration tank load of 0.03-1.80 Kg-BOD/m$^3$/day.

2. The apparatus for treating organic-containing wastewater according to claim 1, further comprising a coagulation tank provided between the aerobic biological treatment means and the solid-liquid separation means, for effecting a coagulation reaction by adding a coagulant to the aerobically biologically treated water.

3. The apparatus for treating organic-containing wastewater according to claim 2, wherein the coagulation tank comprises two coagulation tanks.

4. The apparatus for treating organic-containing wastewater according to claim 1, further comprising solid-liquid separation means provided for performing solid-liquid separation of the anaerobically biologically treated water flowing out of the anaerobic biological treatment means so that the water separated by the solid-liquid separation means is aerobically biologically treated by the aerobic biological treatment means.

5. The apparatus for treating organic-containing wastewater according to claim 4, further comprising a coagulation tank provided between the anaerobic biological treatment means and the solid-liquid separation means for performing solid-liquid separation of the anaerobically biologically treated water flowing out of the anaerobic biological treatment means, for effecting a coagulation reaction by adding a coagulant to the anaerobically biologically treated water.

6. The apparatus for treating organic-containing wastewater according to claim 5, further comprising a filter prior to the reverse osmosis membrane for removing solvent salts.

7. The apparatus for treating organic-containing wastewater according to claim 5, wherein the coagulation tank comprises two coagulation tanks.

8. A method for treating organic-containing wastewater comprising:
   an anaerobic biological treatment step of anaerobically biologically treating organic-containing wastewater at a $COD_{cr}$ sludge load of 0.1-1.0 Kg-$COD_{cr}$/Kg-VSS/day;
   an aerobic biological treatment step of aerobically biologically treating the anaerobically biologically treated water flowing out of the anaerobic biological treatment step at an aeration tank load of 0.03-1.80 Kg-BOD/m$^3$/day;
   a solid-liquid separation step of performing solid-liquid separation of the aerobically biologically treated water flowing out of the aerobic biological treatment step; and
   a reverse osmosis treatment step of removing dissolved substances contained in the water separated by the solid-liquid separation step.

9. The method for treating organic-containing wastewater according to claim 8, further comprising a coagulation step of effecting a coagulation reaction by adding a coagulant to the aerobically biologically treated water between the aerobic biological treatment step and the solid-liquid separation step.

10. The method for treating organic-containing wastewater according to claim 9, further comprising a step of adding a pH adjustor and/or a polymer coagulant after the coagulation step.

11. The method for treating organic-containing wastewater according to claim 8, further comprising a solid-liquid separation step of performing solid-liquid separation of the anaerobically biologically treated water flowing out of the anaerobic biological treatment step so that the water separated by the solid-liquid separation step is aerobically biologically treated in the aerobic biological treatment step.

12. The method for treating organic-containing wastewater according to claim 11, further comprising a coagulation step of effecting a coagulation reaction by adding a coagulant to the anaerobically biologically treated water between the anaerobic biological treatment step and the solid-liquid separation step of performing solid-liquid separation of the anaerobically biologically treated water flowing out of the anaerobic biological treatment step.

13. The method for treating organic-containing wastewater according to claim 12, further comprising a filtering step prior to the reverse osmosis treatment step for removing solvent salts.

14. The method for treating organic-containing wastewater according to claim 12, further comprising a step of adding a pH adjustor and/or a polymer coagulant after the coagulation step.

* * * * *